Patented July 14, 1925.

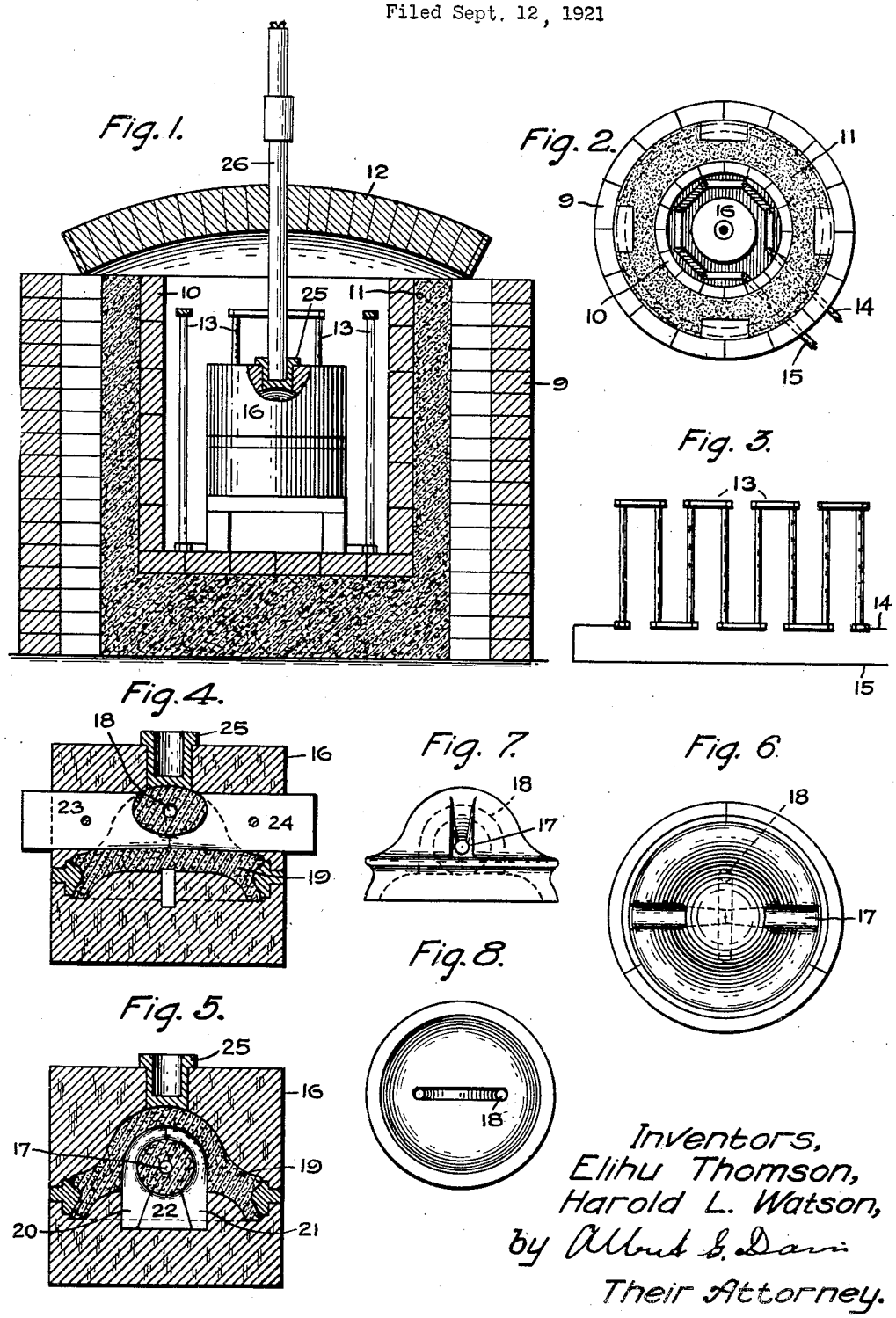

1,546,266

UNITED STATES PATENT OFFICE.

ELIHU THOMSON AND HAROLD L. WATSON, OF LYNN, MASSACHUSETTS, ASSIGNORS TO GENERAL ELECTRIC COMPANY, A CORPORATION OF NEW YORK.

PROCESS OF SHAPING FUSED SILICA.

Application filed September 12, 1921. Serial No. 499,954.

*To all whom it may concern:*

Be it known that we, ELIHU THOMSON and HAROLD L. WATSON, citizens of the United States, residing at Lynn, in the county of Essex, State of Massachusetts, have invented certain new and useful Improvements in Processes of Shaping Fused Silica, of which the following is a specification.

The present invention comprises a process for making articles of fused silica, as, for example, electric line insulators which have a form unadapted for production by an extrusion process, for example, for making objects having a varying cross-section along their major axes.

Silica, because of its high fusing point, requires special treatment for its manipulation. At a temperature sufficiently high to produce liquid silica, the volatilization of the silica is very active so that for this reason alone the shaping of articles from liquefied silica is impracticable. Various expedients have been proposed to overcome the volatility of silica at temperatures at which silica is sufficiently liquid to permit molding or casting into articles of complex shape, but as far as we are aware, no commercial process involving the casting of silica in a mold exists at the present time. One of the most practical methods of obtaining silica articles of simple tubular shape consists in heating a carbon rod in contact with a surrounding mass of silica particles. The exterior of such a tube, however, has a partially sintered porous structure. While the resulting tube is susceptible of some manipulation in the oxyhydrogen flame or arc, the difficulties of manipulation increase rapidly as the size and mass of the objects increase. It is difficult particularly to produce an article of complex or irregular shape, as, for example, a line insulator having cavities or protuberances.

We have discovered that the surface tension and perhaps other internal forces of silica when in a plastic state without actually attaining mobile liquidity enable sound, homogeneous glassy articles to be produced by semifusion of a preformed mass of finely divided silica whereby the product retains the shape of the unfused mass while having all the properties of fused silica.

In accordance with our invention, massive articles of fused silica of any desired complex shape may be made by confining silica particles of suitable size in a mold of desired shape, and heating the molded mass to a temperature sufficiently high to cause the particles to be consolidated into a glassy mass. The finished articles although of smaller size than the interior of the mold preserves the surface configuration of the mold.

The accompanying drawing shows in Fig. 1 a vertical section and in Fig. 2 a horizontal section of one form of apparatus for carrying out our invention. Fig. 3 is a detail view of an electric resistor; Figs. 4 and 5 are sectional views taken at right angles thru a mold containing a mass of silica particles in position ready to be heated; and Figs. 6, 7 and 8 are detail views of one form of insulator produced in accordance with our invention.

The furnace shown in Fig. 1 comprises a housing of suitable refractory material comprising an exterior wall 9 and a highly refractory interior wall 10 with an intervening layer 11 of heat insulating material and a removable roof 12. Adjacent the interior wall 10, as best shown in Fig. 2, is an electric resistor 13 consisting of a plurality of rods of carbon, or other highly refractory material, arranged in series and connected to electric conductors 14, 15 as shown in Fig. 3. Within the heating space surrounded by resistor 13 is a mold 16 consisting of carbonaceous material in which the mass of comminuted silica particles is placed.

Figs. 4 and 5 illustrate a mold adapted for the manufacture of a link insulator which is traversed by intersecting passageways 17, 18 as best shown in Figs. 6 to 8. Confined within the main body of the mold 16 is a mass 19 of comminuted silica particles of desired chemical purity. Ordinarily the silica mass consists of high grade coarse flint sand having rounded particles of a size going through a 20 mesh screen which is obtainable in the market under the trade name of "flint shot". The interconnecting passageway 18 is formed by separable curved carbon members 20, 21, as shown in Fig. 5, held in position by a wedge-shaped key member 22. The upper passage way 17 is formed by carbon members 23, 24, as shown in Fig. 4. A short tube 25 also consisting of carbon forms a part of the upper part of the mold for the insertion of a pyrometer 26, as shown in Fig. 1. With the mold assembled as illustrated and the silica particles firmly packed in position, the furnace is brought up to a temperature of about 1750 degrees C. It is desirable to carefully measure the maximum temperature. If the surface configuration of the silica object to be produced is at all complex, it is necessary to carefully avoid overheating the silica which might cause it to flatten out in the mold, or otherwise cause the surface configuration of the finished article to depart from the inner configuration of the mold. If the maximum temperature does not materially exceeed 1750° C., the silica particles soften sufficiently to coalesce while maintaining the shape of the original mass. The retention of the shape of the mold in the finished fused article is greatly assisted by the decrease in density taking place when the silica particles change from their original crystalline state to the vitreous state of fused silica. As a result the bulk of the fused silica is materially larger than the bulk of the crystalline silica. This expansion of the silica counteracts the shrinkage in bulk caused by the escape of gas between the particles during the process of heating. The escape of gas is assisted by the expansion of the gas at the high temperature at which fusion and coalescence of the particles takes place.

Our process is further favored by the face that silica when changing from solid or the unfused to the liquid or fused state, passes through a relatively long region of plasticity. In other words, instead of melting by a sharp change, as is the case with many other substances, silica softens gradually somewhat like wax, but at such a high temperature that this property heretofore has not been utilized in a practical way.

The finished article has a smooth vitreous appearance as distinguished from a fritted article having a crumbly or porous structure. Under the microscope it will be found that the entire mass is filled with innumerable tiny cavities, which are generally distributed throughout the mass. As the minute cavities are sealed within the mass at a high temperature, the gases contained therein probably are materially below atmospheric pressure. The surface of the finished article, however, is entirely sealed or continuous and hence it is non-porous or impermeable to fluids. The presence of these minute cavities of a substantially undeformed spherical shape distinguishes our product from silica glass made by extrusion, blowing, or other processes involving the shaping of the silica tube produced by the carbon core method. The mechanical strength and insulating qualities of the mass is nearly equal to that of the best fused silica produced by other methods. The density of the described material is about 1.9 to 2.0.

What we claim as new and desire to secure by Letters Patent of the United States, is:—

1. The process of making shaped articles having the properties of fused silica which consists in filling a mold with a mass of particles of substantially pure crystalline silica and heating the mass throughout to a temperature sufficiently high to convert said silica to the vitreous state, causing expansion, and to cause coalescence of the particles and shrinkage counteracting said expansion.

2. The process of making shaped articles of vitreous silica having a non-porous structure which consists in heating in a mold of desired shape a mass of substantially pure silica comprising rounded particles capable of passing through a 20 mesh screen and then heating the mold to a temperature at which said particles are converted to vitreous silica and coalesce without material shrinkage of the mass as a whole.

3. The process of making articles of silica glass which consists in heating silica particles in a mold of desired configuration to a temperature of about 1750° C. thereby causing coalescence of said particles while retaining the shape of the mold.

In witness whereof, we have hereunto set our hands this 31st day of August 1921.

ELIHU THOMSON.
HAROLD L. WATSON.